United States Patent
Hathorn et al.

(10) Patent No.: US 11,251,979 B2
(45) Date of Patent: Feb. 15, 2022

(54) CONTROL OF INFORMATION UNITS FOR ENCRYPTION

(71) Applicant: INTERNATIONAL BUSINESS MACHINES CORPORATION, Armonk, NY (US)

(72) Inventors: Roger G. Hathorn, Tucson, AZ (US); Patricia G. Driever, Poughkeepsie, NY (US); Christopher J. Colonna, Ossining, NY (US); John R. Flanagan, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 16/669,175

(22) Filed: Oct. 30, 2019

(65) Prior Publication Data
US 2021/0135885 A1 May 6, 2021

(51) Int. Cl.
*H04K 1/00* (2006.01)
*H04L 9/32* (2006.01)
*H04L 9/00* (2006.01)

(52) U.S. Cl.
CPC .................. *H04L 9/3271* (2013.01)

(58) Field of Classification Search
CPC .................................................. H04L 9/3271
See application file for complete search history.

(56) References Cited

U.S. PATENT DOCUMENTS

| | | | |
|---|---|---|---|
| 6,438,595 B1 * | 8/2002 | Blumenau | G06F 9/5083 709/226 |
| 7,774,456 B1 * | 8/2010 | Lownsbrough | H04L 41/5083 709/224 |
| 7,934,055 B2 * | 4/2011 | Flynn | G06F 3/0608 711/114 |
| 7,965,843 B1 * | 6/2011 | Maino | H04L 9/0838 380/256 |
| 8,024,773 B2 * | 9/2011 | Butler | H04L 67/2852 726/1 |
| 8,180,987 B2 * | 5/2012 | Hellman | G06F 21/80 711/163 |
| 8,918,651 B2 * | 12/2014 | Greco | G06F 21/80 713/189 |
| 9,053,122 B2 * | 6/2015 | Amit | G06F 16/2365 |
| 9,304,875 B2 * | 4/2016 | Anumalasetty | G06F 11/2007 |
| 2007/0208852 A1 * | 9/2007 | Wexler | G06F 9/505 709/224 |

(Continued)

OTHER PUBLICATIONS

Transmittal of Information on Confidential Activities dated Feb. 21, 2020, p. 1.

(Continued)

*Primary Examiner* — Gary S Gracia
(74) *Attorney, Agent, or Firm* — Konrad Raynes Davda & Victor LLP; Rabindranath Dutta

(57) ABSTRACT

In response to receiving a login request message with a security indicator enabled for security, a storage port establishes a security association by transmitting a response indicating a login accept with the security indicator enabled for security. In response to establishing the security association, the storage port modifies a protocol behavior for transmitting and receiving information units.

20 Claims, 13 Drawing Sheets

(56) References Cited

U.S. PATENT DOCUMENTS

| | | | | |
|---|---|---|---|---|
| 2010/0161650 | A1* | 6/2010 | Chaitanya | G06F 16/24552 707/769 |
| 2011/0314164 | A1* | 12/2011 | Alatorre | H04L 43/0876 709/227 |
| 2013/0163591 | A1* | 6/2013 | Shukla | H04L 61/6045 370/355 |
| 2014/0032727 | A1* | 1/2014 | Kano | H04L 67/1097 709/223 |
| 2014/0169214 | A1* | 6/2014 | Nakajima | H04L 67/1097 370/254 |
| 2016/0342391 | A1* | 11/2016 | Hathorn | G06F 13/426 |
| 2016/0342548 | A1* | 11/2016 | Hathorn | H04L 67/10 |
| 2016/0342549 | A1* | 11/2016 | Hathorn | G06F 5/12 |
| 2017/0091136 | A1* | 3/2017 | Hathorn | G06F 3/0619 |
| 2017/0147248 | A1* | 5/2017 | Chitti | G06F 3/0635 |
| 2017/0338977 | A1* | 11/2017 | Dhanadevan | H04L 12/6418 |
| 2018/0234384 | A1* | 8/2018 | Fang | H04L 61/6045 |
| 2021/0073422 | A1* | 3/2021 | Hathorn | G06F 21/85 |
| 2021/0073423 | A1* | 3/2021 | Hathorn | G06F 21/44 |

OTHER PUBLICATIONS

"Fibre Channel Framing and Signaling—5", INCITS, INCITS working draft proposed American National Standard for Information Technology, Apr. 3, 2018, pp. 506.

"Fibre Channel Link Services Rev 4.04", INCITS, INCITS working draft proposed American National Standard for Information Technology, Jul. 16, 2019, pp. 238.

"Fibre Channel Security Protocols—2", INCITS, INCITS working draft proposed American National Standard for Information Technology, Jun. 12, 2012, pp. 312.

"Fibre Channel Single-Byte Command Code Set Mapping Protocol—5", INCITS, INCITS working draft proposed American National Standard for Information Technology, Mar. 26, 2013, pp. 269.

"Fibre Channel Single-Byte Command Code Set Mapping Protocol—6", INCITS, INCITS working draft proposed American National Standard for Information Technology, Dec. 9, 2015, pp. 287.

"FICON 201 Final", Fibre Channel Industry Association, Live Webcast, Feb. 20, 2019, pp. 36.

\* cited by examiner

Standard protocol for categorizing information units — 400

| FC-SB-6 IU Name | Information Category | Primary Content |
|---|---|---|
| Command IU | Unsolicited Command | Command DIB or Command/Data DIB |
| Solicited Data IU | Solicited Data | Data DIB or Status DIB |
| Unsolicited Data IU | Unsolicited Data | Status DIB |
| Solicited Control IU | Solicited Control | Link Control DIB or Control DIB |
| Unsolicited Control IU | Unsolicited Control | Link Control DIB or Control DIB |
| Transport Command IU | Unsolicited Command | Transport Command Control Block (TCCB) |
| Transport Data IU | Solicited Data | Data |
| Transport Response IU | Command Status | Status and Extended Status |
| Transport Ready IU | Data Descriptor | Data Offset and Length |
| Transport Confirm IU | Solicited Control | none |

FIG. 4

CONTROL OF INFORMATION UNITS FOR ENCRYPTION

BACKGROUND

1. Field

Embodiments relate to the control of information units for encryption.

2. Background

Fibre Channel refers to an integrated set of architectural standards for data transfer developed by the American National Standards Institute (ANSI). Security solutions for the Fibre Channel architecture are provided by Fibre Channel Security Protocols (FC-SP) developed by ANSI. FC-SP provides mechanisms for device authentication, per message security, policy distributions, etc., in a Fibre Channel environment. Fibre Channel Link Services standards (e.g., FC-LS-4) developed by ANSI provide mechanisms for link services in Fibre Channel. Fibre Channel Framing and Signaling standards (e.g., FC-FS-5) developed by ANSI provide mechanisms for framing and signaling in Fibre Channel. Upper level Fibre Channel protocols such as Fibre Channel Protocol (FCP; e.g., FCP-4) or Fibre connection (FICON) developed by ANSI are also used for data transmission and reception over Fibre Channel, where FICON is a protocol of the Fibre Channel architecture and may also be referred to by the formal names of FC-SB-6, FC-SB-5, and other formal names used in other previously adopted FICON protocols.

In a Fibre Channel environment, to provide for secure and encrypted communication between nodes in a Fabric, a Security Association (SA) management transaction occurs between an initiator and a responder using a security establishment protocol. The initiators and responders may comprise ports in adaptors in devices in a Fibre Channel network. Separate security associations are established for data transmission and data reception at a port. Completion of the SA establishment transaction results in a set of security associations and related key material used to encrypt/decrypt data communication between the initiator and the responder under the established security association. An example of a security association protocol is the Security Association Management protocol in FC-SP-2. The protocol is comprised of a pair of messages, SA_Init and SA_Init Response to establish a parent association followed by a pair of messages, SA_Auth and SA_Auth Response to perform authentication of the entities and establish the Security Associations that protect the data transferred between the entities.

A storage controller may control access to storage for one or more host computational devices that may be coupled to the storage controller over a Fibre Channel network. A storage management application that executes in the storage controller may manage a plurality of storage devices, such as disk drives, tape drives, flash drives, direct access storage devices (DASD), etc., that are coupled to the storage controller. A host computational device may send Input/Output (I/O) commands to the storage controller and the storage controller may execute the I/O commands to read data from the storage devices or write data to the storage devices. The communication between the hosts and the storage controller occur via Fibre channel ports located on adapters in the hosts and the storage controller.

A channel is a direct or a switched point-to-point connection between communicating devices. In the Fibre Channel architecture, a. FICON channel may perform the functions specified by FICON protocols to provide access to Input/Output (I/O) devices by means of control units or emulated control units. FICON channels may rely on packet switching for transferring data between communicating devices.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may transmit channel command words at a time along with the associated data for any write operations, where a channel command word and/or the associated data may be referred to as "information units" (IU). The channel command word may be referred to as a command IU, and the associated data may be referred to as a data IU. An IU may comprise a collection of data that is organized according to a particular structure depending on the function being performed or the data content. Information associated with the execution of an I/O operation and the operation of a device is transferred between a channel and a control unit as IUs.

SUMMARY OF THE PREFERRED EMBODIMENTS

Provided are a method, a system, and a computer program product in which in response to receiving a login request message with a security indicator enabled for security, a storage port establishes a security association by transmitting a response indicating a login accept with the security indicator enabled for security. In response to establishing the security association, the storage port modifies a protocol behavior for transmitting and receiving information units.

In further embodiments, the modifying of the protocol behavior comprises transmitting, by the storage port, command mode status information units that include a status device information block (DIB) in frames of information category of command status to avoid encryption of the command mode status information units.

In additional embodiments, the modifying of the protocol behavior comprises receiving, by the storage port, command/data DIBs that use frames of an information category of solicited data without generating an error, wherein use of the frames of the information category of solicited data ensures that the command/data DIBs are encrypted.

In yet additional embodiments, the command/data DIBs have been transmitted by a host port using frames of the information category of solicited data.

In further embodiments, the storage port is included in a storage controller, wherein the host port is included in a host computational device, and wherein the storage port is in communication with the host port over a Fibre Channel communication link.

In certain embodiments, the information units are FICON information units.

In additional embodiments, the login request message is a Fibre Channel login request message.

BRIEF DESCRIPTION OF THE DRAWINGS

Referring now to the drawings in which like reference numbers represent corresponding parts throughout:

FIG. 4 illustrates a block diagram that shows a standard protocol for categorizing information units in Fibre Channel, in accordance with certain embodiments;

DETAILED DESCRIPTION

Figure 1:
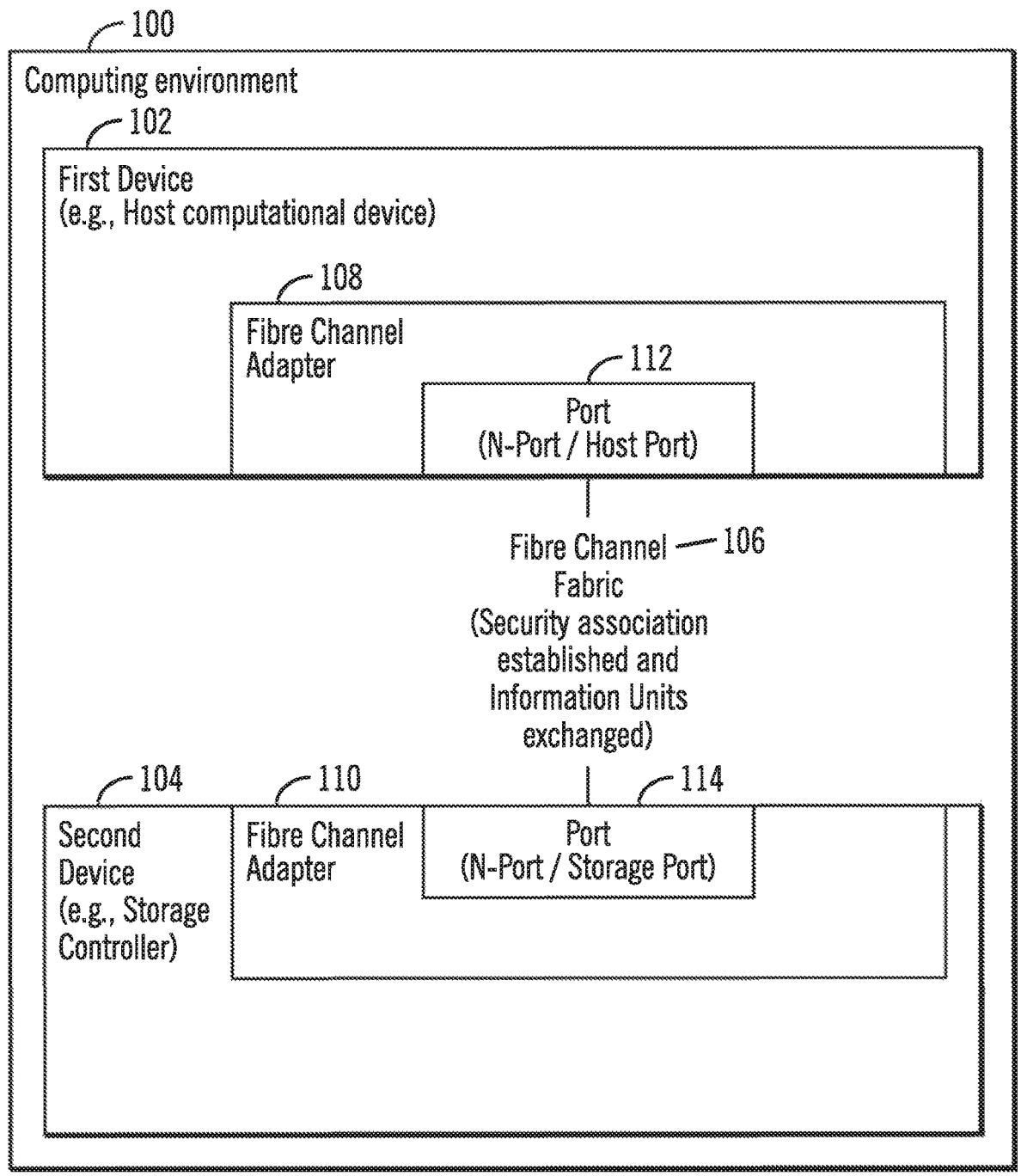
FIG. 1 illustrates a block diagram of a computing environment comprising a host computational device that communicates over a Fibre Channel fabric to a storage controller, in accordance with certain embodiments.

In the following description, reference is made to the accompanying drawings which form a part hereof and which illustrate several embodiments. It is understood that other embodiments may be utilized and structural and operational changes may be made.

The standard for encrypting Fibre Channel links (FC-SP-2) includes protocols for mutual authentication of the two endpoints (i.e., ports) as well as protocols for negotiating encryption keys that are used in communication sessions between the two endpoints. The standard provides support for a variety of mechanisms to authenticate the involved parties and as well as mechanisms by which key material is provided or developed.

In the FC-SP-2 standard, support for authentication within an endpoint is indicated by the setting of the Security Bit of the Common Service parameters passed to the peer during the login process. When set to a value of one in the login request, the Security Bit indicates that the sending port is able to perform authentication. When the responding port accepts the login request, if in the reply the responding port also sets the Security Bit to one then this indicates that the responding port requires the sender of the login to perform authentication before granting any further access.

When a security association to enable encryption is successfully created, the host and storage ports may exchange "encrypted" data, where encrypted data refers to data that is encrypted.

The Fibre Channel Framing and Signaling standard (FC-FS-5) defines a field in each frame that provides a port with assistance in frame routing. The field is called the Routing Control field or R_CTL. The R_CTL field contains routing bits and information bits to categorize the frame function. When the R_CTL field is used in combination with the upper level protocol TYPE field in a frame, it provides a port with assistance in routing frames to a particular upper level protocol such as FCP (FCP-4) or FICON (FC-SB-6). These upper level protocol standards provide a mapping of Information Unit types to R_CTL values to be used in the frames.

Fibre Channel security standards provide for negotiation of "Traffic Selectors" using a Security Association management protocol. These traffic selectors define which frames, identified by R_CTL values, are to be encrypted on the link between a pair of ports (e.g., a host port and a storage device port).

Certain Fibre Channel based encryption of data in flight solutions require that only frames sent using an R_CTL value of solicited data are to be selected for encryption. Solicited Data IUs may be used to carry a Data DIB (e.g., client data) or a Status DIB (e.g., I/O completion status) in standard protocols of Fibre Channel. Certain embodiments provide mechanisms in which all FICON status IUs are sent without encryption and all FICON Command/Data IUs are encrypted by overriding the standard protocols of Fibre Channel. Certain embodiments use secured authenticated encrypted Fibre Channel communication protocols to transfer data between a host computing device (initiator) and a storage controller (target), to improve the performance of the communication and data transfer protocols by adjusting information categories to be sent using encryption. Certain embodiments use a security indicator and other data structures to allow the host processor to send Command/Data IUs using frames of information category solicited data that uses encryption (instead of information category unsolicited Data that is not encrypted). Certain embodiments use the security indicator and other data structures to allow the storage controller to send command mode status IUs using frames of information category command status that is not encrypted (instead of information category solicited data that uses encryption). As a result, improvements are made to devices communicating over the Fibre Channel protocol.

EXEMPLARY EMBODIMENTS

FIG. 1 illustrates a block diagram of a computing environment 100 utilizing a first device 102 coupled to a second device 104. The first device 102 may be coupled to the second device 104 through a Fibre Channel fabric 106 or any other data interface mechanism known in the art. The first device 102 and the second device 104 may be any suitable computational device presently known in the art, such as a personal computer, a workstation, a server, a mainframe, a handheld computer, a telephony device, a network appliance, etc. The first device 102 and the second device 104 may be elements in any suitable network, such as, a storage area network, a wide area network, the Internet, an intranet, etc. In certain embodiments, the first device 102 and the second device 104 may be elements in a cloud computing environment. In certain embodiments, the first device 102 is a host computational device 102 and the second device 104 is a storage controller 104 that control access to storage devices. The host computational device 102 may send input/output (I/O) requests to the storage controller 104 to read and write data with respect to storage devices controlled by the storage controller 104.

Communications over the Fibre Channel fabric 106 between the first device 102 and the second device 104 may be enabled by a Fibre Channel adapter 108 included in the first device 102 and a Fibre Channel adapter 110 included in the second device 104. The Fibre Channel adapter 108 included in the first device 102 includes a port 112, and the Fibre Channel adapter 110 included in the second device 104 includes a port 114, where the ports 112 and 114 may be referred to as N-ports in Fibre Channel terminology. Fibre Channel based communications via the FICON or other protocols may be performed between the port 112 of the first device 102 and the port 114 of the second device 104. A plurality of logical paths may be established between the two Fibre Channel adapters 108, 110.

In certain embodiments, the port 112 that is included in the host computational device 102 is referred to a host port, and the port 114 that is included in the storage controller 104 is referred to as a storage port.

Security associations are established between the host port 112 and the storage port 114 to securely exchange data. Information units which contain data and control information are exchanged between the host port 112 and the storage port 114.

Therefore, FIG. 1, illustrates a computing environment 100 in which a host computational device 102 and a storage controller 104 communicate over Fibre Channel by using a host port 112 and a storage port 114 respectively. Security associations may be established between the host port 112 and the storage port 114 and information units may be exchanged.

Figure 2:
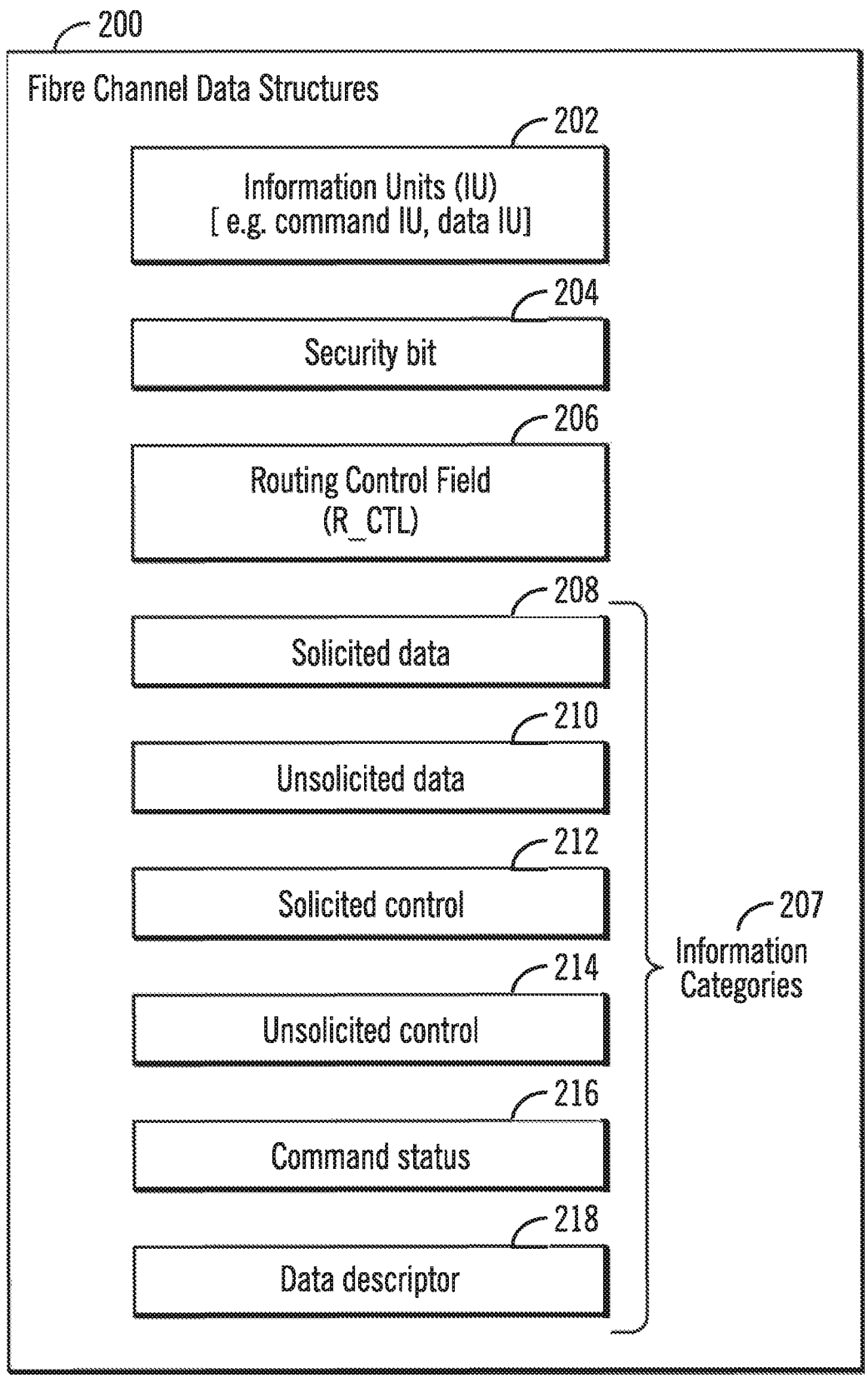
FIG. 2 illustrates a block diagram of exemplary Fibre Channel data structures, in accordance with certain embodiments.

FIG. 2 illustrates a block diagram of Fibre Channel data structures 200, in accordance with certain embodiments.

The data structures 200 include data structures representing information units (IU) 202 that are used in communication between the host port 112 and the storage port 114. The information units 202 may include command information units corresponding to commands, and data information units corresponding to data. There may be many different types of information units.

The data structures 200 include data structures representing a security bit 204. In the FC-SP-2 standard, support for authentication within an endpoint is indicated by the setting of the security bit 204 of the Common Service parameters passed to the peer during the login process. When set to a value of one in the login request, the security bit 204 indicates that the sending port is able to perform authentication. When the responding port accepts the login request, if in the reply the responding port also sets the security bit 204 to one then this indicates that the responding port requires the sender of the login to perform authentication before granting any further access.

The data structures 200 include a routing control field (R_CTL) 206. The Fibre Channel Framing and Signaling standard (FC-FS-5) defines a field in each frame that provides a port with assistance in frame routing via the R_CTL field. The R_CTL field contains routing bits and information bits to categorize the frame function. When the R_CTL field is used in combination with the upper level protocol type field in a frame, it provides a port with assistance in routing frames to a particular upper level protocol such as FCP (FCP-4) or FICON (FC-SB-6). These upper level protocol standards provide a mapping of information unit types to R_CTL values to be used in the frames.

Multiple information categories are defined in Fibre Chanel. The commonly used information categories 207 are solicited data 208, unsolicited data 210, solicited control 212, unsolicited control 214, command status 216 and data descriptor 218.

Figure 3:
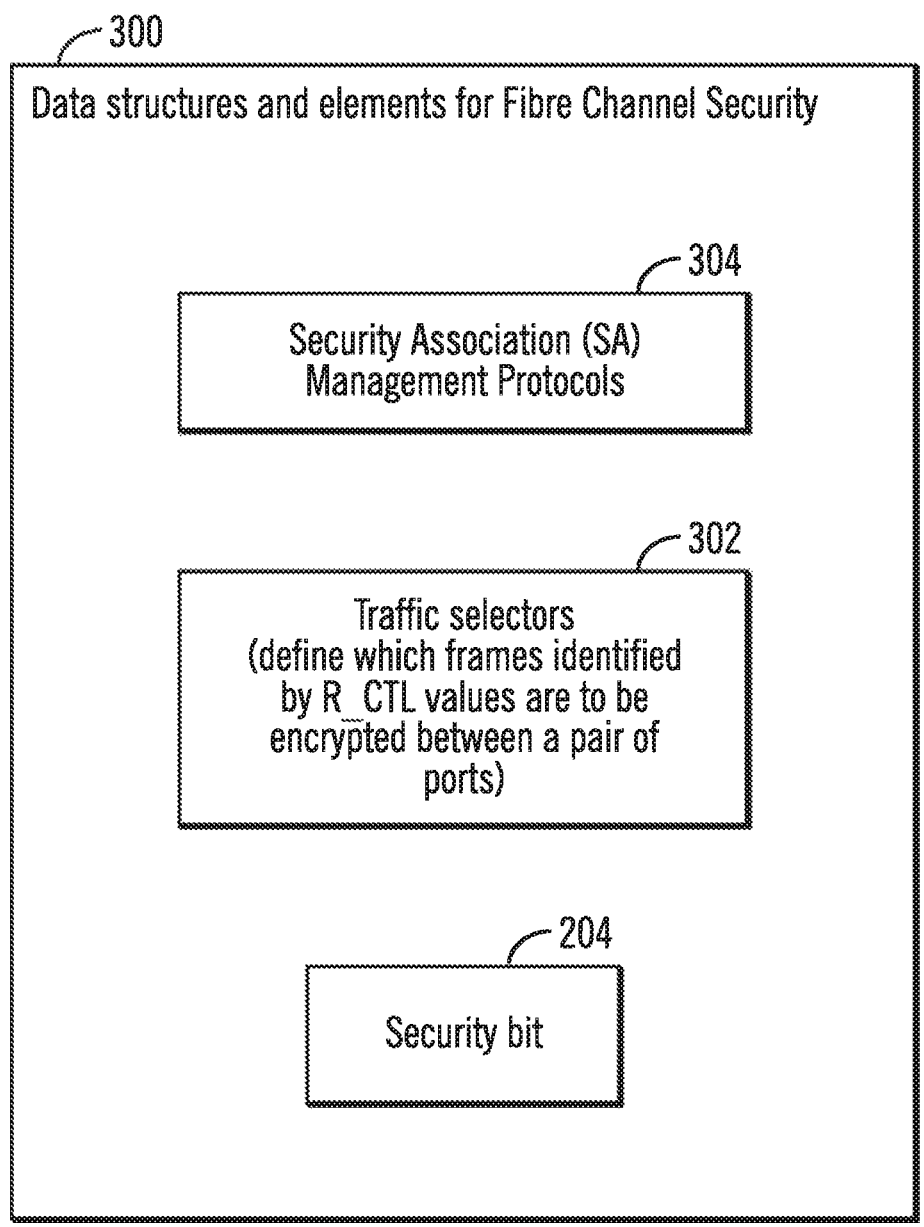
FIG. 3 illustrates a block diagram that shows data structures and elements for security in Fibre Channel, in accordance with certain embodiments.

FIG. 3 illustrates a block diagram 300 that shows data structures and elements for security in Fibre Channel, in accordance with certain embodiments. Fibre Channel security standards provide for negotiation of "Traffic Selectors" 302 by using Security Association management protocols 304. These traffic selectors 302 define which frames, identified by R_CTL values, are to be encrypted on the link between a pair of ports (e.g., a host port 112 and a storage port 114).

FIG. 4 illustrates a block diagram 400 that shows a standard protocol for categorizing information units in Fibre Channel, in accordance with certain embodiments. The standard protocol is in accordance with at least the FC-SB-6 standard of the Fiber Channel architecture.

A Fibre Channel frame header identifies the source and destination of a frame, the exchange and sequence to which a frame belongs, the order in which a frame was sent, and the type of information in the frame payload. The frame header is comprised of a frame routing control field (R_CTL), source link address field and destination link address field, an FC-4 identification field (TYPE), an optional header control field, fields which identify and control FC-FS-4 sequences and exchanges, and a parameter field whose function depends on the frame type.

The R_CTL field contains two sub-fields, the routing bits and the information field. When the routing bits are set to '0000' (binary representation) and the frame is used to send an IU, the information field contains an information category field which identifies the category of the information in the payload. All frames in an FC-SB-6 information unit contains the same information category. The information category of an IU depends on the contents of the IU and the conditions under which the IU is sent. Block 400 summarizes the information categories that are used to send each IU.

In a standard protocol, Fibre Channel based encryption of data in flight requires that only frames sent using an R_CTL value of solicited data are to be selected for encryption. Thus, IUs that are not of the information category of solicited data are not encrypted in the standard protocol.

FIG. 4 shows that solicited data IUs are used to carry a Data DIB (e.g., client data) or a Status DIB (e.g., I/O completion status) [as shown in row indicated via reference numeral 402]. This implies that completion status for a command is encrypted. While this may be alright, it is undesirable from the standpoint of reading traces of protocol for problem determination.

FIG. 4 also indicates (row shown via reference numeral 404) that a Command IU is sent using R_CTL Information Category of Unsolicited Command. A Command IU may carry a Command DIB (i.e., a device command) or a Command/Data DIB. A Command/Data DIB may carry both a device command and write data for the command in a single IU. The nomenclature "Command/Data DIB" is in accordance with the Fibre Channel protocol. This write data may carry client data. According to the selection criteria that only frames with R_CTL information category of solicited data are to be encrypted, this presents a security exposure as client data that needs to be encrypted may not be encrypted in the standard protocol.

Figure 5:
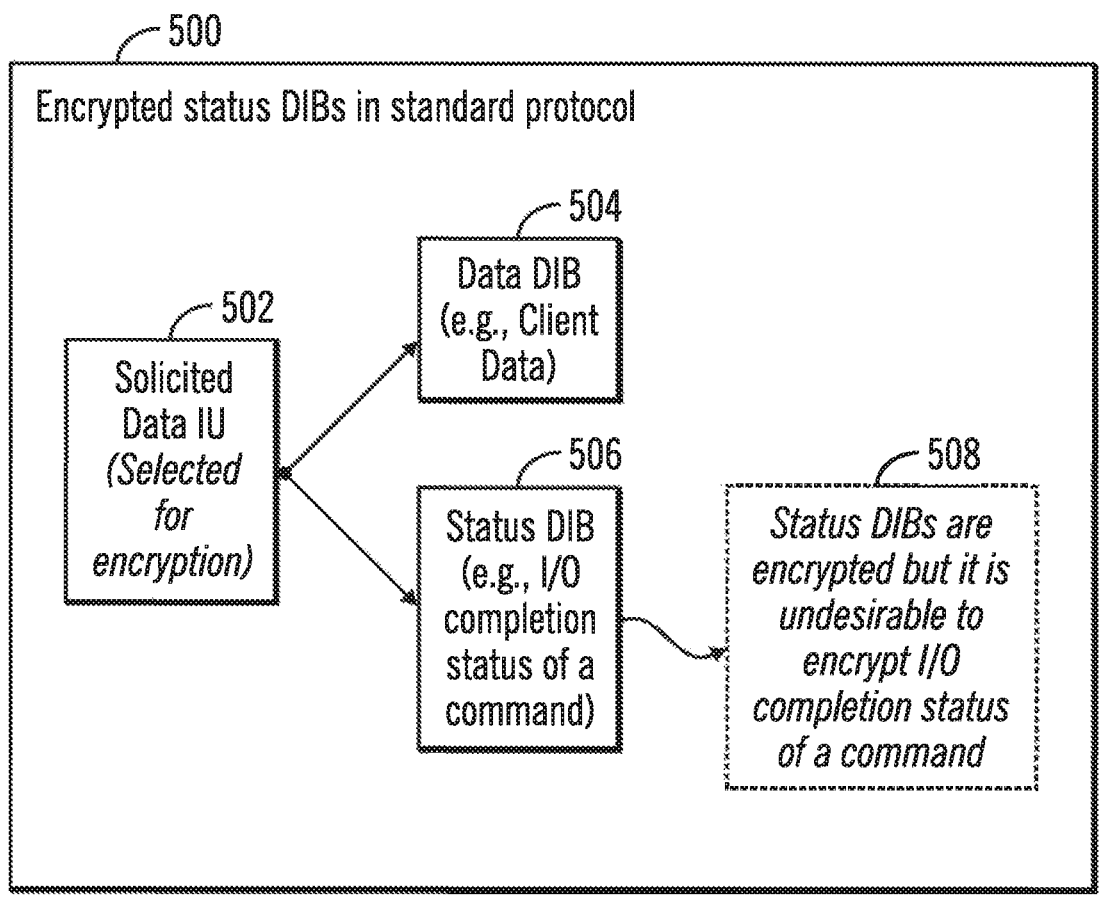
FIG. 5 illustrates a block diagram that shows encrypted status device information blocks (DIB) in a standard protocol, in accordance with certain embodiments.

FIG. 5 illustrates a block diagram 500 that shows encrypted status device information blocks (DIB) in a standard protocol that indicates the information category of an information unit (as shown in FIG. 4), in accordance with certain embodiments.

A solicited data IU 502 is selected for encryption in accordance with the standard protocol. The solicited data IU 502 may be comprised of a data DIB (e.g., client data) 504 or a status DIB (e.g., one that indicates the I/O completion status of a command) 506.

In accordance with the standard protocol, status DIBs 506 are encrypted but it is undesirable to encrypt I/O completion status of a command (as shown via reference numeral 508). Certain embodiments override the standard protocol to encrypt the status DIB 506, so that the I/O completion status of a command is not encrypted.

Figure 6:
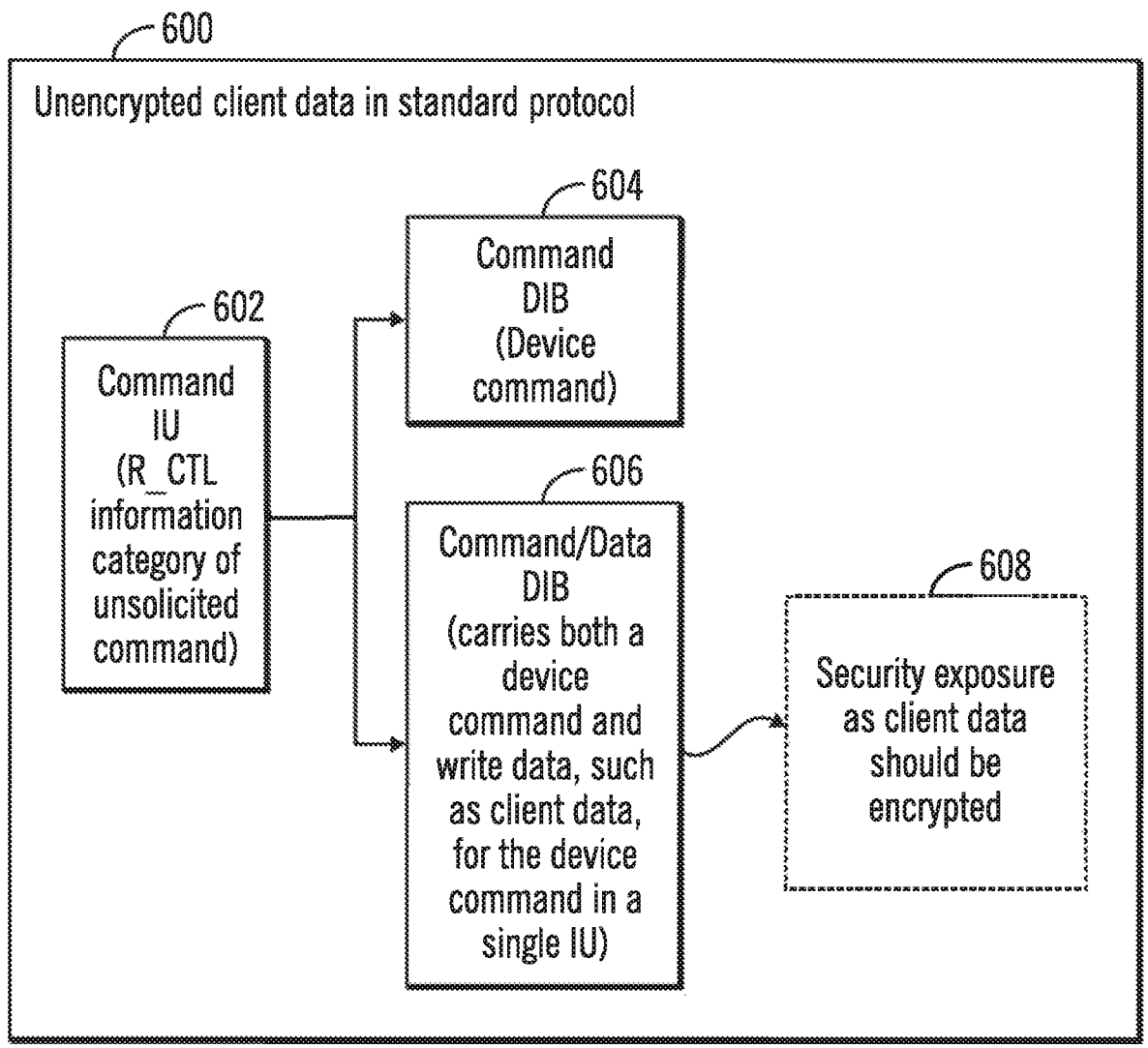
FIG. 6 illustrates a block diagram that shows unencrypted client data in a standard protocol, in accordance with certain embodiments.

FIG. 6 illustrates a block diagram 600 that shows unencrypted client data in a standard protocol, in accordance with certain embodiments.

A command IU 602 that is in the R_CTL information category of unsolicited command may be a command DIB 604 or a command/data DIB 606 that carries both a device command and write data, where the write data may include client data for the device command in a single IU. Since unsolicited commands are unencrypted in the standard protocol, there is a security exposure as the client data included in the write data should be encrypted for security (as shown via reference numeral 608).

Figure 7:
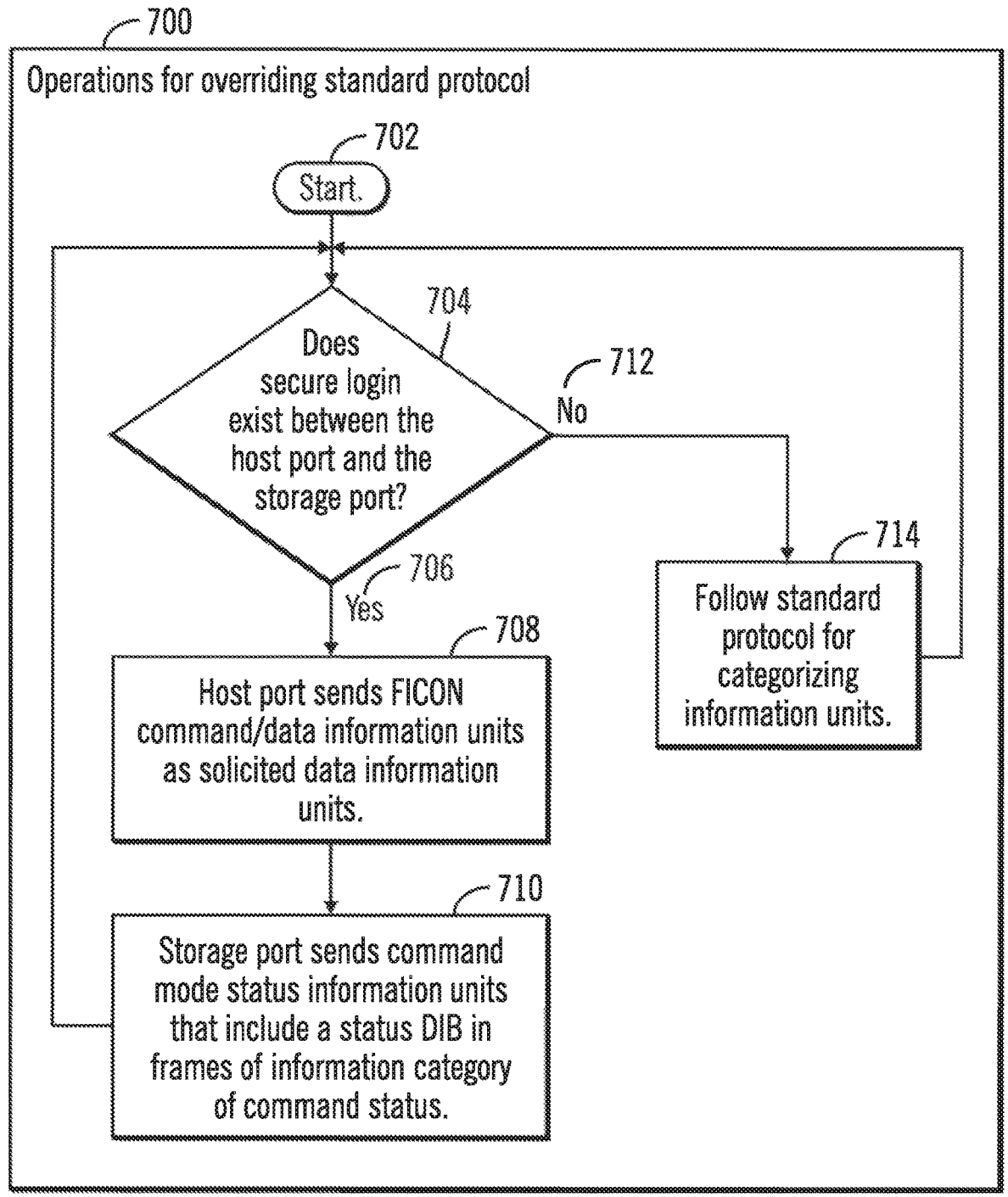
FIG. 7 illustrates a flowchart that shows operations of overriding the standard protocol, in accordance with certain embodiments.

FIG. 7 illustrates a flowchart 700 that shows operations of overriding the standard protocol, in accordance with certain embodiments.

Control starts at block 702 and proceeds to block 704 in which a determination is made as whether a secure login exists between the host port 112 and the storage port 114. If so ("Yes" branch 706) control proceeds to block 708 in which the host port 112 sends FICON command/data information units as solicited data information units to allow for encryption of client data. Control proceeds to block 710 in which the storage port 114 sends command mode status information units that include a status DIB in frames of information category of command status to avoid encryption of status indications. From block 710 control returns to block 704.

If a secure login does not exist between the host port 112 and the storage port 114 ("No" branch 712) control proceeds to block 714 in which the standard protocol for categorizing information units is followed and control returns to block 704.

Figure 8:
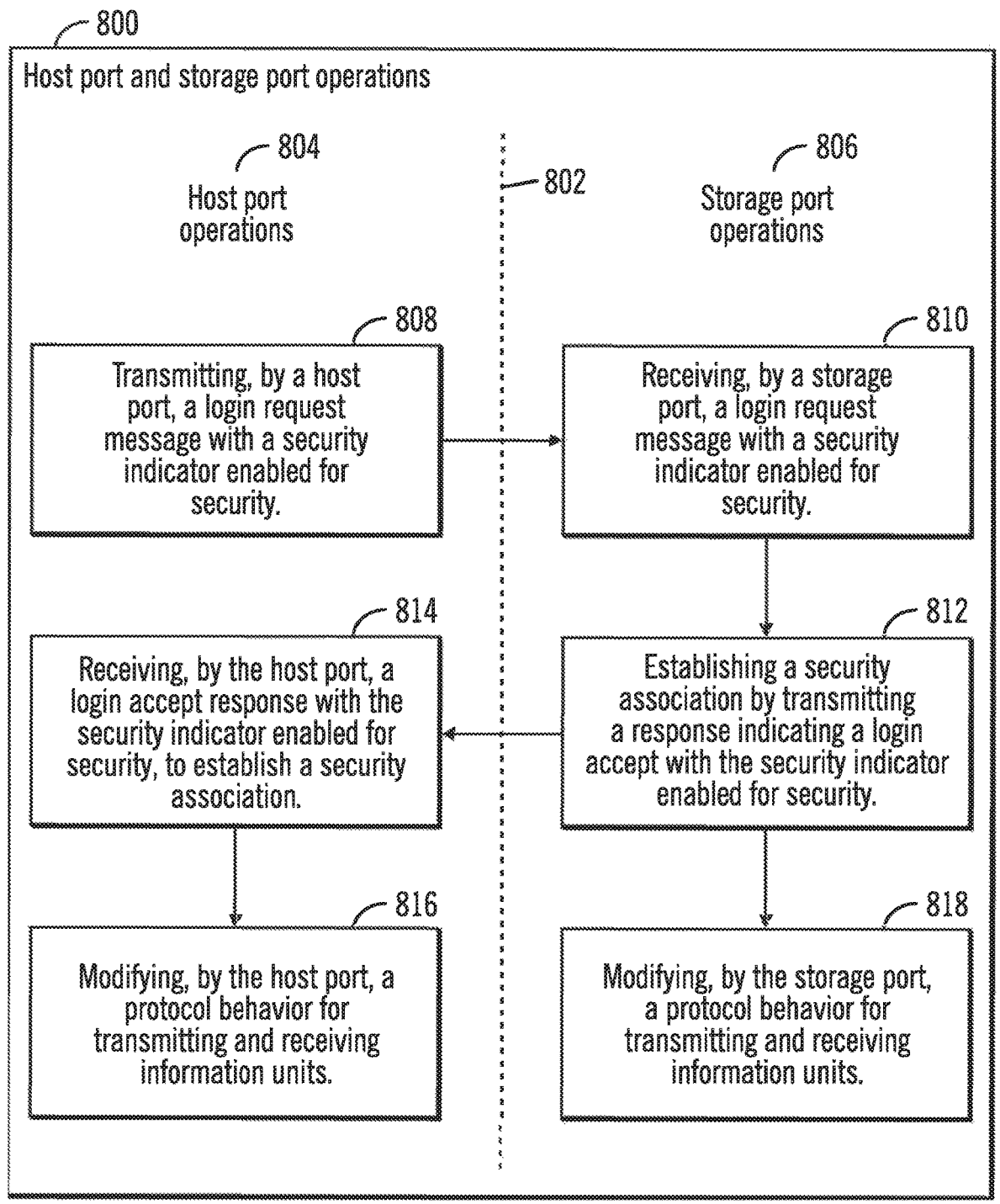
FIG. 8 illustrates a flowchart that shows host port and storage port operations, in accordance with certain embodiments.

FIG. 8 illustrates a flowchart 800 that shows host port 112 and storage port 114 operations, in accordance with certain embodiments.

The operations shown to the left of the dashed line 802 are host port operations 804, and the operations shown to the right of the dashed line 802 are storage port operations 806.

Control starts at block 808 in which the host port 112 transmits a login request message with a security indicator enabled for security by setting the security bit 204 to one. Control proceeds to block 810 in which the storage port 114 receives the login request message with the security indicator enabled for security. The storage port 114 establishes a security association by transmitting a response indicating a login accept with the security indicator enabled for security by setting the security bit 204 to one (at block 812).

From block 812 control proceeds to block 814 in which the host port receives the login accept response with the security indicator enabled for security, to establish a security association.

From block 814 control proceeds to block 816 in which the host port 112 modifies a protocol behavior of the standard protocol for transmitting and receiving information units. From block 812 control also proceeds to block 818 (in addition to block 814) in which the storage port 114 modifies a protocol behavior of the standard protocol for transmitting and receiving information units.

Figure 9:
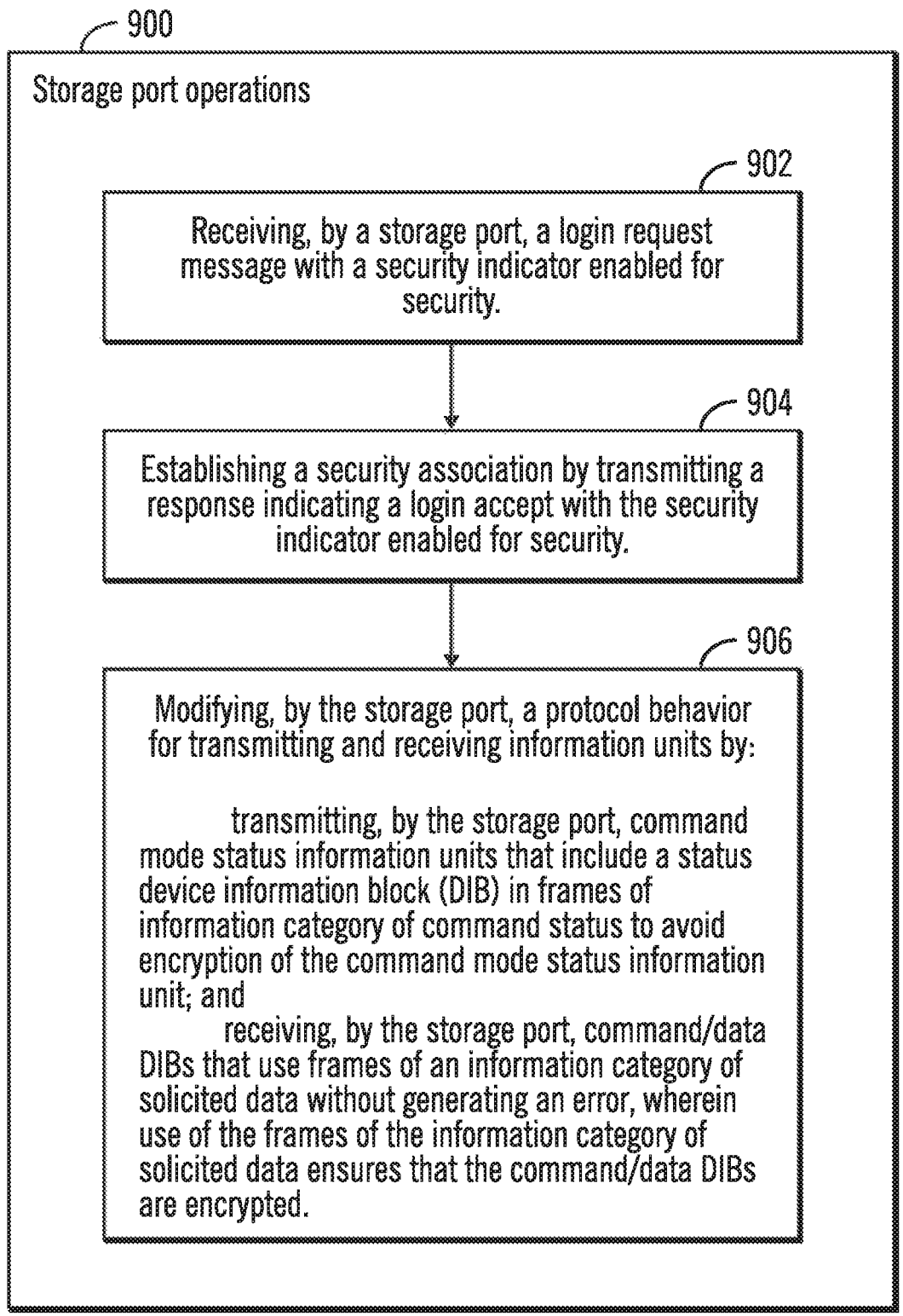
FIG. 9 illustrates a flowchart that shows storage port operations, in accordance with certain embodiments.

FIG. 9 illustrates a flowchart 900 that shows storage port operations, in accordance with certain embodiments. The operations shown in FIG. 9 are performed by the storage port 114 of the storage controller 104.

Control starts at block 902 in which the storage port 114 receives a login request message with a security indicator enabled for security. In response to receiving a login request message with a security indicator enabled for security, the storage port 114 establishes a security association by transmitting (at block 904) a response indicating a login accept with the security indicator enabled for security.

In response to establishing the security association, the storage port modifies (at block 906) a protocol behavior for transmitting and receiving information units by: transmitting, by the storage port, command mode status information units that include a status device information block (DIB) in frames of information category of command status to avoid encryption of the command mode status information units; and receiving, by the storage port, command/data DIBs that use frames of an information category of solicited data without generating an error, wherein use of the frames of the information category of solicited data ensures that the command/data DIBs are encrypted.

Figure 10:
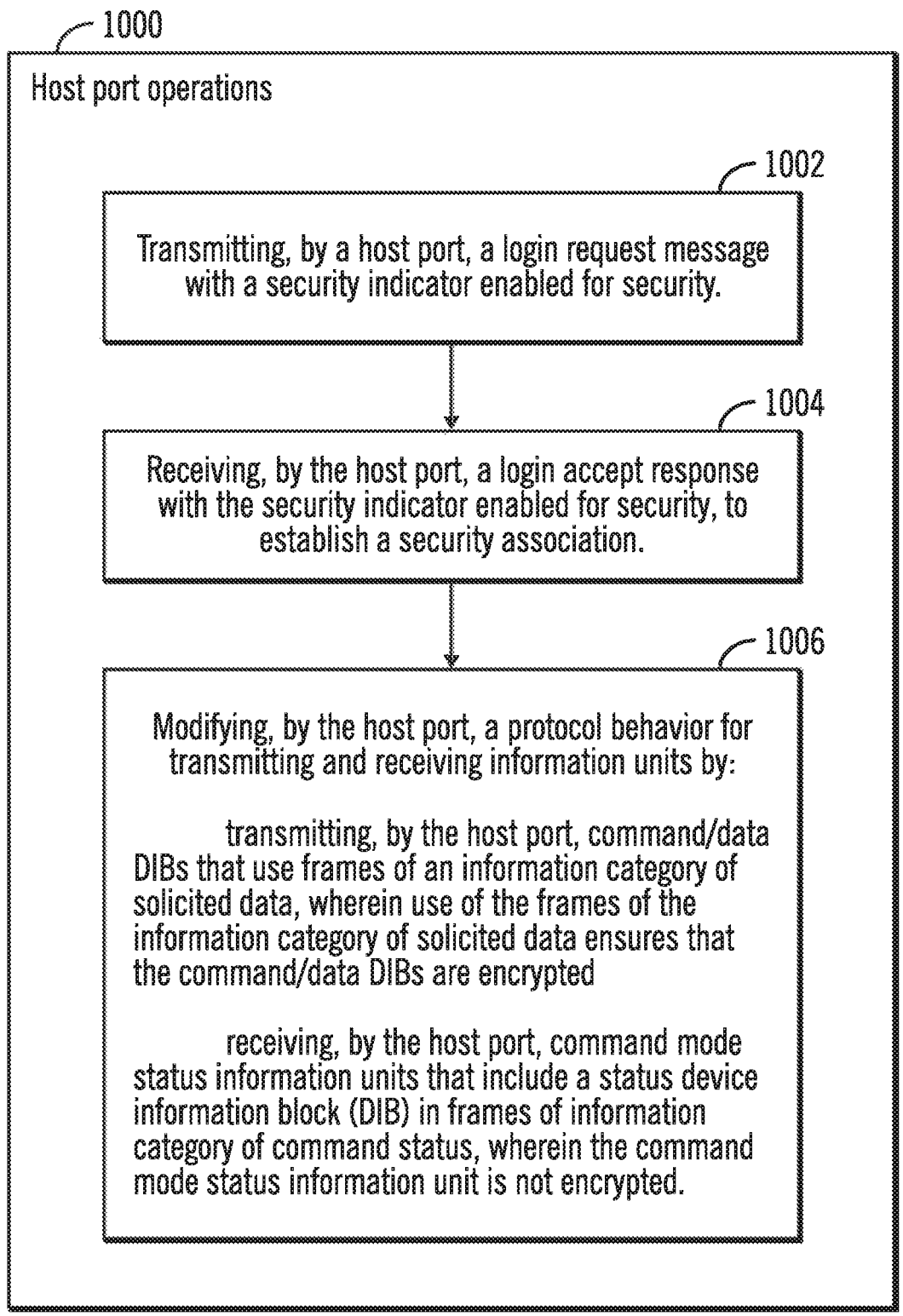
FIG. 10 illustrates a flowchart that shows host port operations, in accordance with certain embodiments.

FIG. 10 illustrates a flowchart 1000 that shows host port operations, in accordance with certain embodiments. The operations shown in. FIG. 10 are performed by the host port 112 of the host computational device 102.

Control starts at block 1002 in which the host port 112 transmits a login request message with a security indicator enabled for security to the storage port 114. The host port 112 receives (at block 1004) a response from the storage port 114 indicating a login accept with the security indicator enabled for security.

In response to establishing the security association, the host port 112 modifies (at block 1006) a protocol behavior for transmitting and receiving information units by: transmitting, by the host port, command/data DIBs that use frames of an information category of solicited data, wherein use of the frames of the information category of solicited data ensures that the command/data DIBs are encrypted; and receiving, by the host port 112, command mode status information units that include a status device information block (DIB) in frames of information category of command status, wherein the command mode status information unit is not encrypted.

Therefore, FIGS. 1-10 illustrate certain embodiments that override the standard Fibre Channel protocols to ensure that security is enforced while transmitting and receiving client data, and control information is not encrypted even though the standard Fibre Channel protocols may dictate otherwise.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 11:
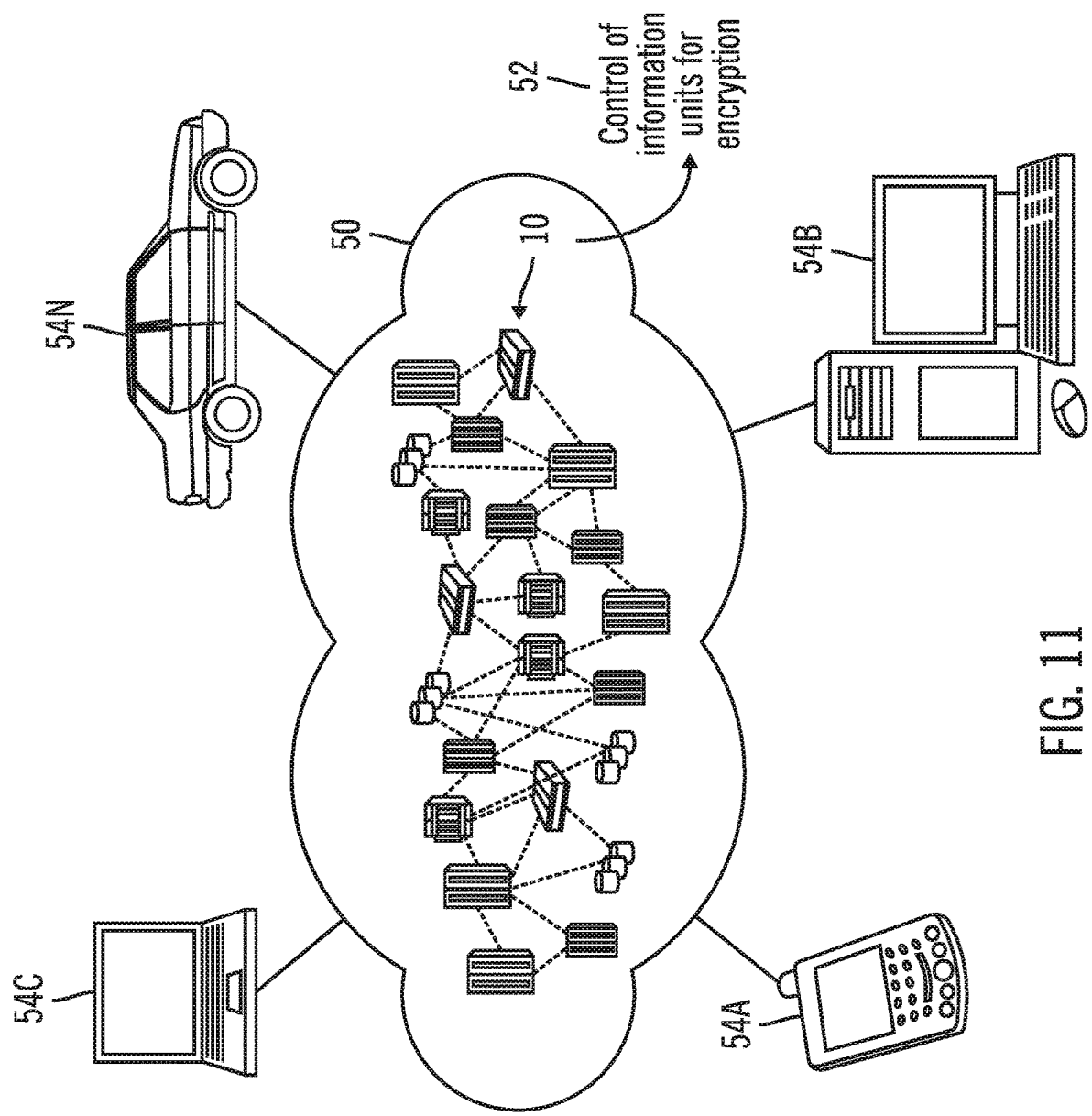
FIG. 11 illustrates a block diagram of a cloud computing environment, in accordance with certain embodiments.

Referring now to FIG. 11 an illustrative cloud computing environment 50 is depicted. Control of information units for encryption (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
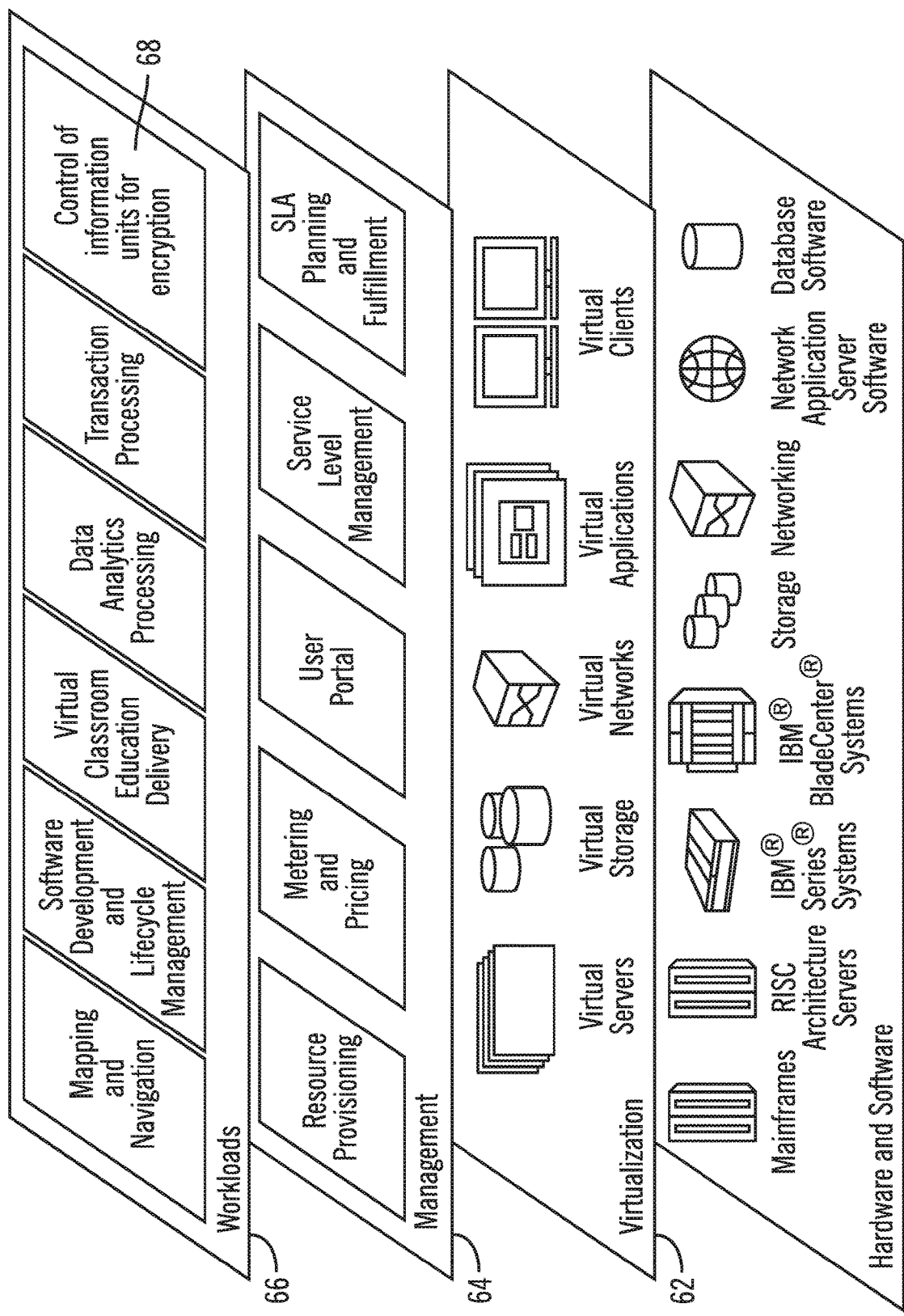
FIG. 12 illustrates a block diagram of further details of the cloud computing environment of FIG. 11, in accordance with certain embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and control of information units for encryption 68 as shown in FIGS. 1-12.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 13:
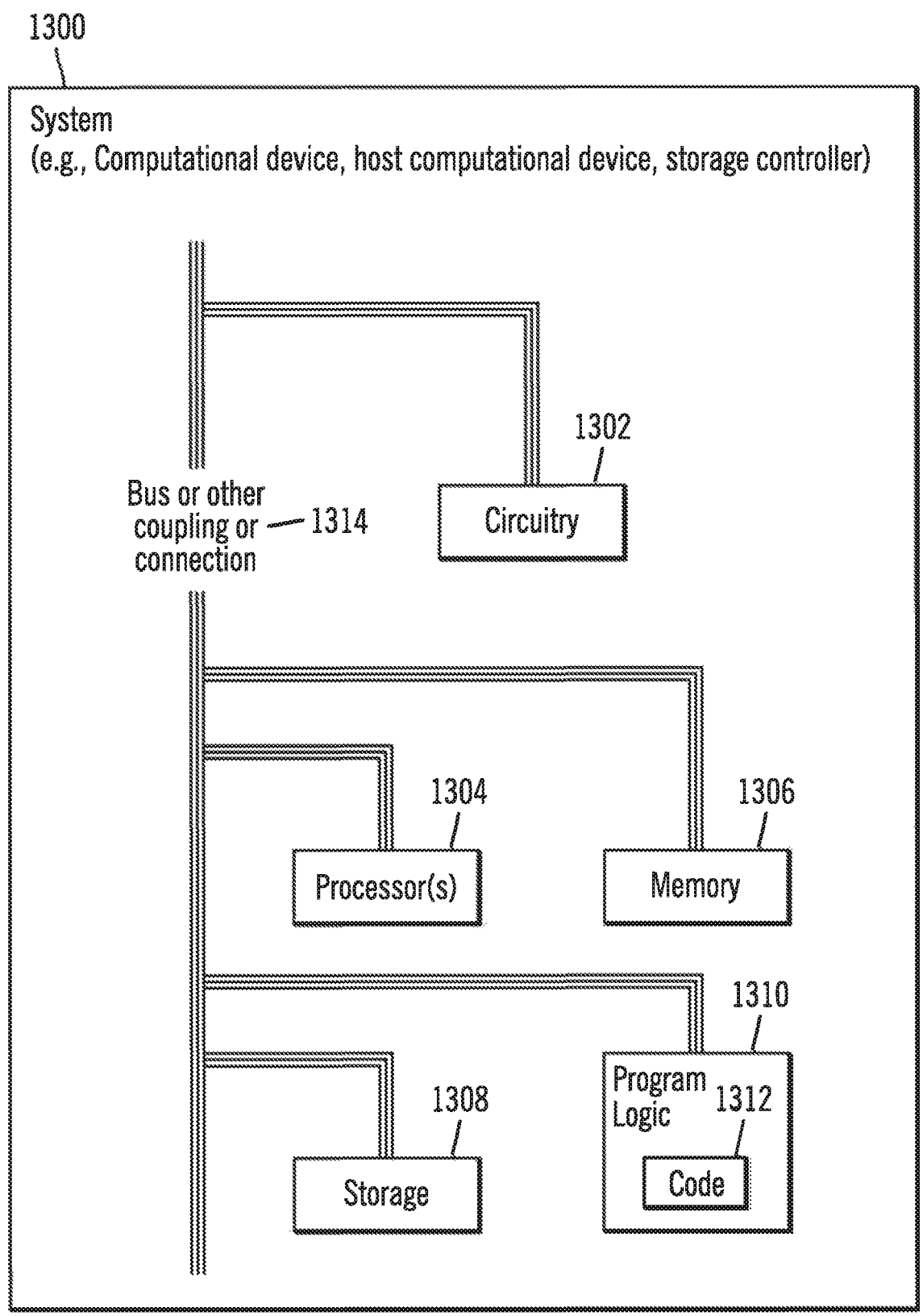
FIG. 13 illustrates a block diagram of a computational system that shows certain elements that may be included in host computational devices and storage controllers, as described in FIGS. 1-12, in accordance with certain embodiments.

FIG. 13 illustrates a block diagram that shows certain elements that may be included in the computational devices, the host computational devices, the storage controllers or other devices shown in FIGS. 1-12, in accordance with certain embodiments. The system 1300 may include a circuitry 1302 that may in certain embodiments include at least a processor 1304. The system 1300 may also include a memory 1306 (e.g., a volatile memory device), and storage 1308. The storage 1308 may include a non-volatile memory device (e.g., EEPROM, ROM, PROM, flash, firmware, programmable logic, etc.), magnetic disk drive, optical disk drive, tape drive, etc. The storage 1308 may comprise an internal storage device, an attached storage device and/or a network accessible storage device. The system 1300 may include a program logic 1310 including code 1312 that may be loaded into the memory 1306 and executed by the processor 1304 or circuitry 1302. In certain embodiments, the program logic 1310 including code 1312 may be stored in the storage 1308. In certain other embodiments, the program logic 1310 may be implemented in the circuitry 1302. One or more of the components in the system 1300 may communicate via a bus or via other coupling or connection 1314. Therefore, while FIG. 13 shows the program logic 1310 separately from the other elements, the program logic 1310 may be implemented in the memory 1306 and/or the circuitry 1302.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    in response to receiving, by a storage port, a login request message with a security indicator enabled for security, establishing a security association by transmitting a response indicating a login accept with the security indicator enabled for security; and
    in response to establishing the security association, modifying, by the storage port, a protocol behavior for transmitting and receiving information units, wherein a standard protocol for categorizing information units is overridden in response to a secure login existing between the storage port and a host port, wherein the standard protocol for categorizing information units is followed in response to a secure login not existing between the storage port and the host port, and wherein the storage port receives command/data device information blocks (DIBs) that use frames of an information category of solicited data from the host port while overriding the standard protocol.

2. The method of claim 1, wherein the modifying of the protocol behavior comprises:
    transmitting, by the storage port, command mode status information units that include a status device information block (DIB) in frames of information category of command status to avoid encryption of the command mode status information units.

3. The method of claim 1, wherein the modifying of the protocol behavior comprises:
    receiving, by the storage port, the command/data DIBs that use the frames of the information category of solicited data without generating an error, wherein use of the frames of the information category of solicited data ensures that the command/data DIBs are encrypted.

4. The method of claim 3, wherein the command/data DIBs have been transmitted by a host port using frames of the information category of solicited data.

5. The method of claim 4, wherein the storage port is included in a storage controller, wherein the host port is included in a host computational device, and wherein the storage port is in communication with the host port over a Fibre Channel communication link.

6. The method of claim 1, wherein the information units are FICON information units.

7. The method of claim 1, wherein the login request message is a Fibre Channel login request message.

8. A system, comprising:
    a memory; and
    a processor coupled to the memory, wherein the processor performs operations, the operations comprising:
        in response to receiving, by a storage port, a login request message with a security indicator enabled for security, establishing a security association by transmitting a response indicating a login accept with the security indicator enabled for security; and
        in response to establishing the security association, modifying, by the storage port, a protocol behavior for transmitting and receiving information units, wherein a standard protocol for categorizing information units is overridden in response to a secure login existing between the storage port and a host port, wherein the standard protocol for categorizing information units is followed in response to a secure login not existing between the storage port and the host port, and wherein the storage port receives command/data device information blocks (DIBs) that use frames of an information category of solicited data from the host port while overriding the standard protocol.

9. The system of claim 8, wherein the modifying of the protocol behavior comprises:
    transmitting, by the storage port, command mode status information units that include a status device information block (DIB) in frames of information category of command status to avoid encryption of the command mode status information units.

10. The system of claim 8, wherein the modifying of the protocol behavior comprises:
    receiving, by the storage port, the command/data DIBs that use the frames of the information category of solicited data without generating an error, wherein use of the frames of the information category of solicited data ensures that the command/data DIBs are encrypted.

11. The system of claim 10, wherein the command/data DIBs have been transmitted by a host port using frames of the information category of solicited data.

12. The system of claim 11, wherein the storage port is included in a storage controller, wherein the host port is included in a host computational device, and wherein the storage port is in communication with the host port over a Fibre Channel communication link.

13. The system of claim 8, wherein the information units are FICON information units.

14. The system of claim 8, wherein the login request message is a Fibre Channel login request message.

15. A computer program product, the computer program product comprising a non-transitory computer readable storage medium having computer readable program code embodied therewith, the computer readable program code configured to perform operations, the operations comprising:

in response to receiving, by a storage port, a login request message with a security indicator enabled for security, establishing a security association by transmitting a response indicating a login accept with the security indicator enabled for security; and in response to establishing the security association, modifying, by the storage port, a protocol behavior for transmitting and receiving information units, wherein a standard protocol for categorizing information units is overridden in response to a secure login existing between the storage port and a host port, wherein the standard protocol for categorizing information units is followed in response to a secure login not existing between the storage port and the host port, and wherein the storage port receives command/data device information blocks (DIBs) that use frames of an information category of solicited data from the host port while overriding the standard protocol.

16. The computer program product of claim 15, wherein the modifying of the protocol behavior comprises:

transmitting, by the storage port, command mode status information units that include a status device information block (DIB) in frames of information category of command status to avoid encryption of the command mode status information units.

17. The computer program product of claim 15, wherein the modifying of the protocol behavior comprises:

receiving, by the storage port, the command/data DIBs that use the frames of the information category of solicited data without generating an error, wherein use of the frames of the information category of solicited data ensures that the command/data DIBs are encrypted.

18. The computer program product of claim 17, wherein the command/data DIBs have been transmitted by a host port using frames of the information category of solicited data.

19. The computer program product of claim 18, wherein the storage port is included in a storage controller, wherein the host port is included in a host computational device, and wherein the storage port is in communication with the host port over a Fibre Channel communication link.

20. The computer program product of claim 15, wherein the information units are FICON information units, and wherein the login request message is a Fibre Channel login request message.

* * * * *